(12) United States Patent
Tong

(10) Patent No.: US 9,632,684 B2
(45) Date of Patent: Apr. 25, 2017

(54) METHOD, DEVICE AND TERMINAL FOR GENERATING LOGIC SERVICE FOR EMBEDDED TERMINAL

(75) Inventor: Wei Tong, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 397 days.

(21) Appl. No.: 14/368,580

(22) PCT Filed: Jun. 29, 2012

(86) PCT No.: PCT/CN2012/077954
§ 371 (c)(1),
(2), (4) Date: Sep. 16, 2014

(87) PCT Pub. No.: WO2013/075496
PCT Pub. Date: May 30, 2013

(65) Prior Publication Data
US 2015/0040063 A1    Feb. 5, 2015

(30) Foreign Application Priority Data
Nov. 23, 2011  (CN) .......................... 2011 1 0376244

(51) Int. Cl.
*G06F 15/00*     (2006.01)
*G06F 13/00*     (2006.01)
(Continued)

(52) U.S. Cl.
CPC ...... *G06F 3/04847* (2013.01); *G06F 9/44505* (2013.01); *G06F 9/54* (2013.01); *G06F 17/30864* (2013.01)

(58) Field of Classification Search
CPC ................ G06F 3/0484; G06F 17/30
(Continued)

(56) References Cited

U.S. PATENT DOCUMENTS 5,522,024 A  * 5/1996 Hiraga ................. G06F 9/45512
715/700
5,748,894 A  * 5/1998 Ishizaki .................. G06F 9/542
709/202
(Continued)

FOREIGN PATENT DOCUMENTS

CN            1584828 A       2/2005
CN          101410824 A       4/2009
(Continued)

OTHER PUBLICATIONS

International Search Report in international application No. PCT/CN2012/077954, mailed on Aug. 23, 2012.
(Continued)

*Primary Examiner* — Kevin Nguyen
(74) *Attorney, Agent, or Firm* — Oppedahl Patent Law Firm LLC

(57) ABSTRACT

Disclosed are a method, device and terminal for generating a logical service for an embedded terminal, and the method includes: application logic information of an application is configured to form a configuration file; a logic management module identifies a visual interface code input by a user, queries corresponding application logic information in the configuration file according to an identification result and generates window logic messages of a visual interface, and generates automatically a corresponding family of manipulation functions by the window logic messages so as to form a logic management framework interacting with the interface. For different applications or an upgrade of a same application, the method, device and terminal for generating a logical service for an embedded terminal provided by the present disclosure can rapidly generate a corresponding logical service.

15 Claims, 2 Drawing Sheets

(51) Int. Cl.
 *G06F 3/0484* (2013.01)
 *G06F 9/445* (2006.01)
 *G06F 9/54* (2006.01)
 *G06F 17/30* (2006.01)

(58) Field of Classification Search
 USPC ....... 715/804, 729, 728, 810, 716, 706, 740, 715/866
 See application file for complete search history.

(56) References Cited

U.S. PATENT DOCUMENTS

| | | | |
|---|---|---|---|
| 7,631,296 B2 | 12/2009 | Seshadri et al. | |
| 2003/0222906 A1* | 12/2003 | Fish | G06F 8/20 715/744 |
| 2005/0246686 A1 | 11/2005 | Seshadri et al. | |
| 2009/0168787 A1* | 7/2009 | Ansari | H04L 12/66 370/401 |

FOREIGN PATENT DOCUMENTS

| | | |
|---|---|---|
| CN | 101799754 A | 8/2010 |
| CN | 101901267 A | 12/2010 |
| CN | 102231162 A | 11/2011 |
| CN | 102236559 A | 11/2011 |
| CN | 102520927 A | 6/2012 |

OTHER PUBLICATIONS

English Translation of the Written Opinion of the International Search Authority in international application No. PCT/CN2012/077954, mailed on Aug. 23, 2012.

\* cited by examiner

METHOD, DEVICE AND TERMINAL FOR GENERATING LOGIC SERVICE FOR EMBEDDED TERMINAL

TECHNICAL FIELD

The present disclosure relates to the field of embedded mobile terminal, and in particular to a method, device and terminal for generating a logical service for an embedded terminal.

BACKGROUND

With the rapid development of mobile communication technique, there are various mobile terminals available in the market, and with the growing prevalence of communication terminals, e.g., mobile terminals (such as mobile phones), competition between terminal device manufacturers becomes increasingly fierce. Therefore, in the increasingly fierce market competition in the future, those who can deliver rapidly a terminal with a more user-friendly design will obtain an early start in the market.

At present, in the application development of an embedded mobile terminal, there is strong coupling among application interfaces, control flows and service functions, thus in the case that an interface customization or a service change is needed, it often turns out that applications need to be fully changed or re-designed. Particularly in the field of mobile phones, since the market demand changes greatly, functions and models of mobile phones change frequently, but the traditional development mode is relatively fixed, mobile phone manufacturers can not customize flexibly functions of a mobile phone according to the market demand, thereby their capabilities of giving a rapid response to the market is affected.

In the field of current embedded mobile terminals, interface display, service call and control flow operation are not fully separated, the design and coding of an interface is implemented by manual coding and a visual design through a tool can not be performed; control and processing of application services, interfaces and services associate with each other, and a tightly-coupled correlation exists therebetween. With respect to a specific application, such as an application on a mobile phone, most of its control flows are fixed and each model of mobile phones correspond to certain fixed control flows. Therefore, the case in which codes are not separated will result in a problem that the efficiency is low and the cost is high when a mobile phone needs to be fully changed.

In addition, in the circumstances of tight coupling, since a fully change of application flows will inevitably result in modification of views and logics of codes and modifications of codes disperse in everywhere of the codes, various unknown errors will be resulted during the modification such that testing needs to be performed successively thereafter to fix the errors, thus a stable period of the testing becomes long, thereby resulting in a further decrease in efficiency.

SUMMARY

The present disclosure provides a method, device and terminal for generating a logical service for an embedded terminal, which can rapidly generate a corresponding logical service for different applications or an upgrade of a same application.

To this end, the present disclosure adopts the following technical solutions.

A method for generating a logical service for an embedded terminal, including:

application logic information of an application is configured to form a configuration file;

a logic management module identifies a visual interface code input by a user, queries corresponding application logic information in the configuration file according to an identification result and generates window logic messages of a visual interface, and generates automatically a corresponding family of manipulation functions by the window logic messages, and forms a logic management framework interacting with the interface.

In an embodiment, the method may further include:

the logic management module generates automatically a corresponding family of manipulation functions through identifying a message of a protocol stack stated in a public header file of an application service and according to corresponding application logic information in the configuration file, and forms a logic management framework interacting with the protocol stack.

In an embodiment, the method may further include:

the logic management module generates automatically a corresponding family of manipulation functions for an inter-application message through querying the inter-application message stated in the configuration file, and forms a logic management framework interacting between applications.

Preferably, the application logic information configured in the configuration file includes at least one of: an application name, information of a thread where the application is located, information for determining whether the application is multi-threaded and multi-thread information of the application.

More preferably, default configuration and the logic management framework interacting with the interface are configured into an interface thread, and the logic management framework interacting with the protocol stack is configured into a default control flow thread.

A device for generating a logical service for an embedded terminal, including:

a configuration module configured to configure application logic information of an application to form a configuration file; and a logic management module configured to identify a visual interface code input by a user, query corresponding application logic information in the configuration file according to an identification result and generate window logic messages of a visual interface, and generate automatically a corresponding family of manipulation functions by the window logic messages, and form a logic management framework interacting with the interface.

In an embodiment, the logic management module is further configured to generate automatically a corresponding family of manipulation functions through identifying a message of a protocol stack stated in a public header file of an application service and according to corresponding application logic information in the configuration file, and from a logic management framework interacting with the protocol stack.

In an embodiment, the logic management module is further configured to generate a corresponding family of manipulation functions for an inter-application message through querying the inter-application message stated in the configuration file, and form a logic management framework interacting between applications.

Preferably, the application logic information configured in the configuration file includes at least one of: an application name, information of a thread where the application is located, information for determining whether the application is multi-threaded and multi-thread information of the application.

More preferably, default configuration and the logic management framework interacting with the interface are configured into an interface thread, and the logic management framework interacting with the protocol stack is configured into a default control flow thread.

A terminal including the aforementioned device for generating a logical service for an embedded terminal, wherein the device includes:

a configuration module configured to configure application logic information of an application to form a configuration file; and a logic management module configured to identify a visual interface code input by a user, query corresponding application logic information in the configuration file according to an identification result and generate window logic messages of a visual interface, and generate automatically a corresponding family of manipulation functions by the window logic messages so as to form a logic management framework interacting with the interface.

It can be seen from the above technical solutions of the present disclosure that compared to the prior art, the present disclosure has the following beneficial effects:

1. Logical processing events in an application are managed unifiedly, a processing entry is generated automatically after the events are received, and the unified management of logical events enables a control structure of a logic management module to be simple and clear.

2. In combination with a configuration module, a control portion and a resource portion of an application are managed separately so that application development is performed according to a Model View Controller (MVC) mode, where each character focuses on its own events, thus division of labor is clearer and modification of one character will not result in a great effect on other characters.

3. Configurable portions in a logic control are separated so that on one hand it facilitates the introduction of a User Interface (UI) design tool and on the other hand configuration of a thread enables a developer to know well dynamic performance of codes.

4. The solidification and automation of control flows enables a developer to focus on a corresponding logic development.

5. It has good transportability, and in combination with the solidification of an application service and instrumentalization of an UI, an application can be conveniently transplanted by using a logic management module. If there are no control codes, the logic control can be configured to generate them automatically; if there are control codes, what only needs to be done is to configure the logic control as Not Automatically Generated by a logic management module and select a processing function for a corresponding message in a visual interface.

The objectives of the present disclosure, its functional characteristics and beneficial effects will be further described below in combination with specific embodiments and accompanying drawings.

DETAILED DESCRIPTION

The technical solutions of the present disclosure will be further elaborated below in combination with specific embodiments and accompanying drawings so that those skilled in the art can better understand the present disclosure and put it into practice, but the embodiments given herein are not intended to limit the present disclosure.

To solve the problem in processing an interactive event between an application and an UI of an embedded mobile terminal so as to implement a decoupling between applications, a decoupling between an application and a platform, a decoupling between an application and a Graphical User Interface (GUI) software, and a decoupling between a control, service and window within an application, a model for application development needs to be generally considered.

Figure 1:
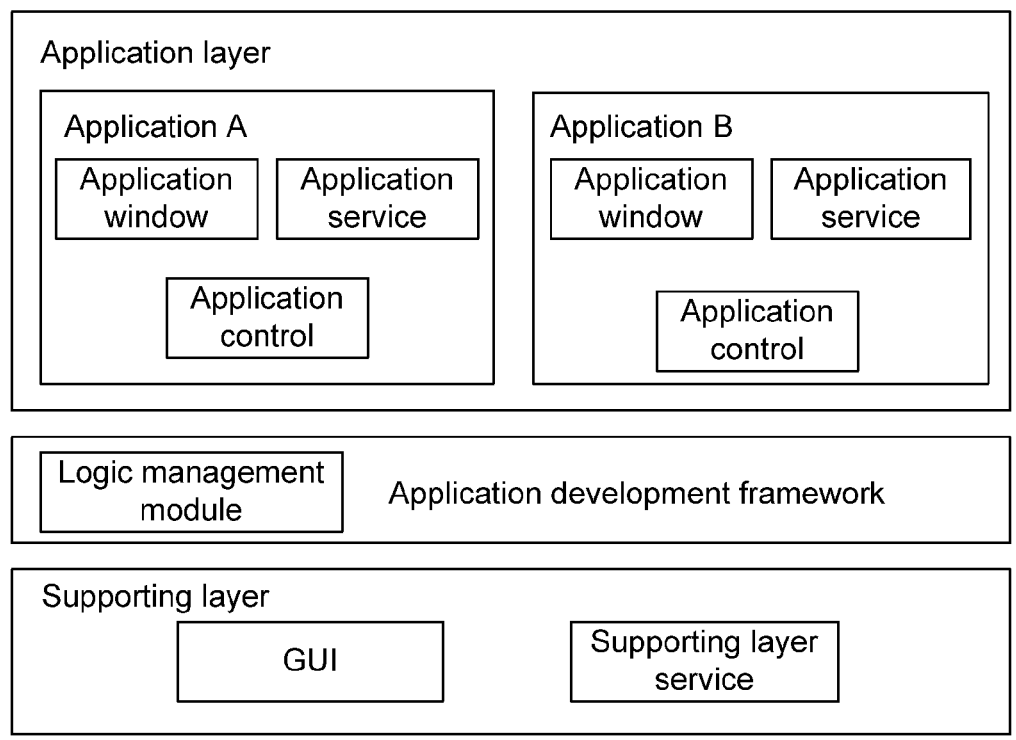
FIG. 1 is a schematic diagram illustrating the position of a logic management module in an embedded system according to the present disclosure.

As shown in FIG. 1, it shows the position of a logic management module in a system. An application development framework provides a platform so as to support a developer to develop applications thereon. Communications are performed within an application and between applications through the application development framework. A logic control belongs to a part of the application development framework, an application window sends a message to the application control, an application service reports an message to the application control, and after being processed through a logic management module, an inter-application message generates automatically an application control code framework.

The application development framework further includes an application management module, a window management module, a configuration management module, a data management module and an event management module, wherein the event management module, configuration management module and application management module are three necessary elements.

Figure 2:
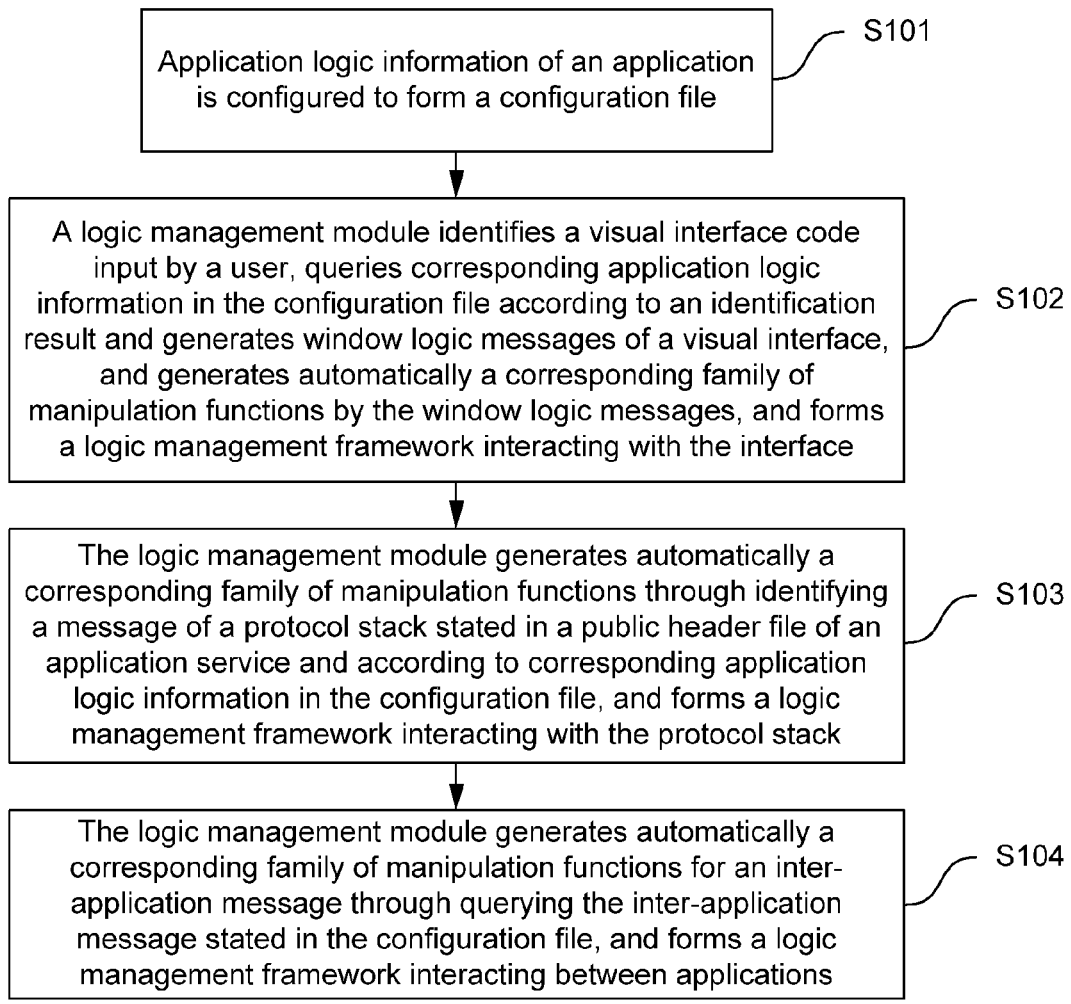
FIG. 2 is a schematic flow diagram of a method for generating a logical service for an embedded terminal provided by an embodiment of the present disclosure.

As shown in FIG. 2, it is a schematic flow diagram of a method for generating a logical service for an embedded terminal provided by an embodiment of the present disclosure, and the method includes the following steps:

S101, application logic information of an application is configured to form a configuration file;

in this step, the application logic information configured in the configuration file includes at least one of: an application name, information of a thread where the application is located, information for determining whether the application is multi-threaded and multi-thread information of the application. More preferably, default configuration and the logic management framework interacting with the interface are configured into an interface thread, and the logic management framework interacting with the protocol stack is configured into a default control flow thread. For example, in practical applications, information of a thread where the application is located, an application name, information for determining whether the application is multi-threaded and multi-thread information of the application are mainly configured in a configuration file. Default configuration and a logic management framework interacting with an interface are configured into an interface thread, and a framework interacting with a protocol stack is configured into a default control flow thread. For a message of a protocol stack, which has special requirements on real-time performance, the control flow can be configured into an independent thread. Here an inter-application message also needs to be configured by stating, in a configuration file, message names of other applications to which attention need to be paid.

S102, a logic management module identifies a visual interface code input by a user, queries corresponding application logic information in the configuration file according to an identification result and generates window logic messages of a visual interface, and generates automatically a corresponding family of manipulation functions by the window logic messages so as to form a logic management framework interacting with the interface.

In this step, in an UI separate framework, interaction between an interface and a control logic is implemented through an UI message, visual interface codes are performed manually or through a tool, a portion which needs to interact with the logic states corresponding messages and annotations, a logic management module identifies these codes, and states and annotates automatically window logic messages generated during the generation of the visual interface, and a family of manipulation functions are automatically generated by these logic messages so as to form a logic management framework interacting with the interface.

In a preferred embodiment, after implementing all the steps above, the method for generating a logical service for an embedded terminal further includes:

S103, the logic management module generates automatically a corresponding family of manipulation functions through identifying a message of a protocol stack stated in a public header file of an application service and according to corresponding application logic information in the configuration file so as to form a logic management framework interacting with the protocol stack.

In this step, messages of a protocol stack which need to be processed by each application is basically fixed, and these messages of the protocol stack are stated in a public header file of an application service, a logic management module, through identifying an statement of messages of a protocol stack by a service header file in combination with configuration information of an application, states automatically different application channels, states attentions paid to corresponding messages of the protocol stack, and generates automatically a corresponding family of manipulation functions so as to form a logic management frame interacting with the protocol stack.

In a preferred embodiment, the method for generating a logical service for an embedded terminal according to the example further includes:

S104, the logic management module generates automatically a corresponding family of manipulation functions for an inter-application message through querying the inter-application message stated in the configuration file so as to form a logic management framework interacting between applications.

In this step, through a statement of other application messages configured in the configuration file, a corresponding family of manipulation functions for an inter-application message are generated automatically so as to form a logic management framework associated with other applications.

The step 101 is configured to configure related information of an application logic, and the information includes logic thread information of an application, interface interaction information, protocol stack interaction information and inter-application interaction information. Depending on the information, subsequent logic management frameworks automatically generate codes.

In addition, the advantage of using configuration is that it facilitates the introduction of an UI design tool. By using an UI design tool, control information of an application can be compiled manually, together with the use of a tool-visualized design window interface, generate finally a manipulation function corresponding to a message. The message can be correlated through configuration management and flow control codes.

In the steps S102 to S104, the logic management module positions messages (window message, protocol message, inter-application message and the like) in an application framework, and generates automatically a corresponding processing process after performing certain preprocessing (for example, formatting names and detecting duplicated names). For a message of a protocol stack, a corresponding processing process is stated in different threads.

With all the above steps, for different applications or an upgrade of a same application, a processing of a logic by the application(s) can be rapidly generated. For example, a new window or a message of a protocol stack is newly added, if there are no special requirements from a thread, a logic management framework can automatically generate a logic entry code, in addition, when an inter-application message is newly added, after a simple statement in a configuration file, a logic entry code is automatically generated.

In practical implementations, the process of using a logic management module in application development are as follows.

(1) A GUI tool calls an interface of the a logic management module, and starts to control a process of generating frameworks.

(2) Proceed to an application configuration stage, for example, threads, inter-application relations and scopes for generating automatically frameworks are configured.

(3) The logic management module reads configuration content.

(4) An inter-application processing framework is generated according to inter-application messages.

(5) Interface codes are read so as to acquire control request messages in the interface codes.

(6) An interface message processing framework is generated.

(7) Application service codes are read so as to acquire service messages provided by a service.

(8) A service message processing framework is generated.

(9) A corresponding header file and control processing file are synthesized.

In addition, specific implementing steps of the logic management module are described as follows.

(1) The logic management module reads configurations of a corresponding application, detects a scope for generating automatically frameworks, a thread where the application is located, and detects whether a public thread or a newly-started thread is used and whether processing frameworks of window messages, service messages and inter-application messages are generated.

(2) The logic management module detects window messages in the application window codes so as to generate a window message control framework by an application control.

(3) The logic management module detects reported messages in platform (service) codes so as to generate a processing framework of service messages in the application control.

(4) An inter-application processing framework is generated according to an inter-application message statement.

Figure 3:
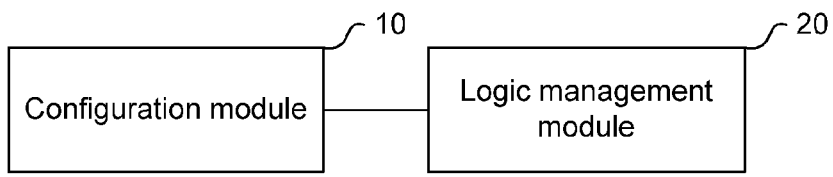
FIG. 3 is a schematic structural diagram of a device for generating a logical service for an embedded terminal provided by an embodiment of the present disclosure.

Accordingly, an embodiment of the present disclosure further provides a device for generating a logical service for an embedded terminal, as shown in FIG. 3, the device includes:

a configuration module 10 configured to configure application logic information of an application to form a configuration file; wherein in a preferred embodiment, the application logic information configured in the configuration file includes at least one of: an application name, information of a thread where the application is located, information for determining whether the application is multi-threaded and multi-thread information of the application; more preferably, default configuration and the logic management framework interacting with the interface are configured into an interface thread, and the logic management framework interacting with the protocol stack is configured into a default control flow thread.

a logic management module 20 configured to identify a visual interface code input by a user, query corresponding application logic information in the configuration file according to an identification result and generate window logic messages of a visual interface, and generate automatically a corresponding family of manipulation functions by the window logic messages so as to form a logic management framework interacting with the interface.

In a preferred embodiment, the logic management module 20 is further configured to generate automatically a corresponding family of manipulation functions through identifying a message of a protocol stack stated in a public header file of an application service and according to corresponding application logic information in the configuration file so as to form a logic management framework interacting with the protocol stack.

In a preferred embodiment, the logic management module 20 is further configured to generate a corresponding family of manipulation functions for an inter-application message through querying the inter-application message stated in the configuration file so as to form a logic management framework interacting between applications.

Accordingly, an embodiment of the present disclosure further provides a terminal including the aforementioned device for generating a logical service for an embedded terminal, referring to FIG. 3, the device includes:

a configuration module 10 configured to configure application logic information of an application to form a configuration file; and a logic management module 20 configured to identify a visual interface code input by a user, query corresponding application logic information in the configuration file according to an identification result and generate window logic messages of a visual interface, and generate automatically a corresponding family of manipulation functions by the window logic messages so as to form a logic management framework interacting with the interface.

What described are merely preferable embodiments of the present disclosure, and are not intended to limit the scope of protection of the present disclosure. All equivalent structures and flow changes made using the specification and accompanying drawings of the present disclosure, or direct or indirect applications of the present disclosure to other related technical fields should be included within the scope of protection of the present disclosure.

INDUSTRIAL APPLICABILITY

Logical processing events in an application are managed unifiedly in the present disclosure, a processing entry is generated automatically after the events are received, and the unified management of logical events enables a control structure of a logic management module to be simple and clear. Moreover, in combination with a configuration module, a control portion and a resource portion of an application are managed separately so that application development is performed according to a MVC mode, where each character focuses on its own events, thus division of labor is clearer and modification of one character will not result in a great effect on other characters.

The invention claimed is:

1. A method for generating a logical service for an embedded terminal, comprising:
    configuring application logic information of an application to form a configuration file;
    identifying, by a logic management module, a visual interface code input by a user, querying corresponding application logic information in the configuration file according to an identification result and stating and annotating automatically the identified code to generate window logic messages of a visual interface, and generating automatically a corresponding family of manipulation functions by the window logic messages, wherein the family of manipulation functions forms a logic management framework interacting with the interface.

2. The method according to claim 1, further comprising:
    generating automatically, by the logic management module, a corresponding family of manipulation functions through identifying a message of a protocol stack stated in a public header file of an application service and according to corresponding application logic information in the configuration file, and forming a logic management framework interacting with the protocol stack.

3. The method according to claim 1, further comprising:
    generating automatically, by the logic management module, a corresponding family of manipulation functions for an inter-application message through querying the inter-application message stated in the configuration file, and forming a logic management framework interacting between applications.

4. The method according to claim 1, wherein the application logic information configured in the configuration file comprises at least one of: an application name, information of a thread where the application is located, information for determining whether the application is multi-threaded and multi-thread information of the application.

5. The method according to claim 4, wherein default configuration and the logic management framework interacting with the interface are configured into an interface thread, and the logic management framework interacting with the protocol stack is configured into a default control flow thread.

6. A device for generating a logical service for an embedded terminal, comprising:
    a configuration module configured to configure application logic information of an application to form a configuration file; and
    a logic management module configured to identify a visual interface code input by a user, query corresponding application logic information in the configuration file according to an identification result and state and annotate automatically the identified code to generate window logic messages of a visual interface, and generate automatically a corresponding family of manipulation functions by the window logic messages, wherein the family of manipulation functions forms a logic management framework interacting with the interface.

7. The device according to claim 6, wherein the logic management module is further configured to generate automatically a corresponding family of manipulation functions through identifying a message of a protocol stack stated in a public header file of an application service and according to corresponding application logic information in the configuration file, and form a logic management framework interacting with the protocol stack.

8. The device according to claim 6, wherein the logic management module is further configured to generate a corresponding family of manipulation functions for an inter-application message through querying the inter-application message stated in the configuration file, and form a logic management framework interacting between applications.

9. The device according to claim 6, wherein the application logic information configured in the configuration file comprises at least one of: an application name, information of a thread where the application is located, information for determining whether the application is multi-threaded and multi-thread information of the application.

10. The device according to claim 9, wherein default configuration and the logic management framework interacting with the interface are configured into an interface thread, and the logic management framework interacting with the protocol stack is configured into a default control flow thread.

11. A terminal comprising the device for generating a logical service for an embedded terminal according to claim 6.

12. A terminal comprising the device for generating a logical service for an embedded terminal according to claim 7.

13. A terminal comprising the device for generating a logical service for an embedded terminal according to claim 8.

14. A terminal comprising the device for generating a logical service for an embedded terminal according to claim 9.

15. A terminal comprising the device for generating a logical service for an embedded terminal according to claim 10.

* * * * *